(12) United States Patent
Bass et al.

(10) Patent No.: US 12,456,556 B2
(45) Date of Patent: Oct. 28, 2025

(54) COOLANT CLEANUP AND HEAT-SINKING SYSTEMS AND METHODS OF OPERATING THE SAME

(71) Applicant: GE-Hitachi Nuclear Energy Americas LLC, Wilmington, NC (US)

(72) Inventors: Derek Bass, Wilmington, NC (US); Christer N. Dahlgren, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 162 days.

(21) Appl. No.: 18/092,580

(22) Filed: Jan. 3, 2023

(65) Prior Publication Data
US 2023/0142980 A1    May 11, 2023

Related U.S. Application Data

(62) Division of application No. 16/582,638, filed on Sep. 25, 2019, now Pat. No. 11,545,274.

(51) Int. Cl.
G21C 19/307    (2006.01)
G21C 15/243    (2006.01)

(52) U.S. Cl.
CPC ......... *G21C 19/307* (2013.01); *G21C 15/243* (2013.01)

(58) Field of Classification Search
CPC . G21D 1/00; G21D 1/04; G21C 15/18; G21C 15/182; G21C 19/30; G21C 19/307; G21C 19/31; G21C 19/313
See application file for complete search history.

(56) References Cited

U.S. PATENT DOCUMENTS 3,873,447 A * 3/1975 Pohl .................... G21C 19/313
                                                        210/187
4,312,703 A * 1/1982 Woudstra ............... G21C 15/18
                                                        376/402
(Continued)

FOREIGN PATENT DOCUMENTS

EP    3453024 B1 * 9/2020    ............. G21C 1/03
JP    61215996 A  * 9/1986    ............ G21C 15/18
(Continued)

OTHER PUBLICATIONS

Triplett, Brian S., Eric P. Loewen, and Brett J. Dooies. "PRISM: a competitive small modular sodium-cooled reactor." Nuclear Technology 178.2 (2012): 186-200. (Year: 2012).*
(Continued)

*Primary Examiner* — Sharon M Davis
(74) *Attorney, Agent, or Firm* — Alley IP

(57) ABSTRACT

Combined cleanup and heat sink systems work with nuclear reactor coolant loops. Combined systems may join hotter and colder sections of the coolant loops in parallel with any steam generator or other extractor and provide optional heat removal between the same. Combined systems also remove impurities or debris from a fluid coolant without significant heat loss from the coolant. A cooler in the combined system may increase in capacity or be augmented in number to move between purifying cooling and major heat removal from the coolant, potentially as an emergency cooler. The cooler may be joined to the hotter and colder sections through valved flow paths depending on desired functionality. Sections of the coolant loops may be fully above the cooler, which may be above the reactor, to drive flow by gravity and enhance isolation of sections of the coolant loop.

13 Claims, 3 Drawing Sheets

(56) References Cited

U.S. PATENT DOCUMENTS

2013/0301782 A1   11/2013   Malloy, III
2014/0362968 A1   12/2014   Marie et al.

FOREIGN PATENT DOCUMENTS

JP   02-206799   8/1990
JP   07-218684   8/1995
JP   09-000240   4/1997

OTHER PUBLICATIONS

Rajamani, A., et al. "Post shut-down decay heat removal from nuclear reactor core by natural convection loops in sodium pool." Nuclear Engineering and Design 301 (2016): 59-73. (Year: 2016).*
Espacenet translation of JP-61215996-A (Year: 1986).*
EPO, Extended European Search Report in corresponding EP application 20868445.6, Aug. 31, 2023.
JPO, Office Action in corresponding JP Application 2022-515516, Jul. 24, 2024.

* cited by examiner

COOLANT CLEANUP AND HEAT-SINKING SYSTEMS AND METHODS OF OPERATING THE SAME

RELATED APPLICATIONS

This application is a divisional of, and claims priority under 35 U.S.C. §§ 120 & 121 to, U.S. patent application Ser. No. 16/582,638, filed Sep. 25, 2019, now U.S. Pat. No. 11,545,274, the original contents of which are incorporated herein by reference in their entirety.

BACKGROUND

Nuclear reactors with high operating temperatures may use a fluid heat exchange media, such as a liquid metal or molten salt, for coolant. The heat exchange media may transfer heat from a reactor to a heat exchanger and/or turbine for energy extraction and electricity generation as well as act as a heat sink to remove decay heat or other unwanted heat during operation or a shutdown condition. Many reactor designs, including, for example, liquid sodium-cooled fast reactors, such as the PRISM reactor, use multiple loops of heat exchange media to efficiently transfer heat away from a reactor for electrical generation and cooling. One loop may be an intermediate loop that is heated in an intermediate heat exchanger and then passed through a steam generator connected to a turbine and generator. Any fluid heat exchange media, such as liquid lead or sodium, molten salts, etc. may be used for this heat exchange in the intermediate loop.

Intermediate loops using fluid media may benefit from cleanup of the heat exchange media to remove impurities or debris that may accumulate during operation in a nuclear reactor environment. FIG. 1 is an illustration of a related art cleanup system 10 useable with an intermediate loop carrying a fluid heat exchange media. For example, system 10 may be a sodium cleanup loop useable with an intermediate coolant loop of a liquid sodium reactor or molten salt reactor.

As shown in FIG. 1, system 10 includes input 50 and output 67 that may connect to a same leg of an intermediate coolant loop, just far enough apart to prevent backflow or short-circuiting between the two, such as a few feet apart. Input 50 and output 67 may be intake from and returns to an intermediate coolant loop, removing and then re-supplying a relatively small amount of coolant from/to the intermediate loop. Pump 51 may push the fluid coolant through system 10. Regenerative heat exchanger 60 may be used to initially cool an incoming coolant stream 61 with outgoing, cooler coolant that is to be resupplied to the intermediate loop by output 67. The cooled coolant stream 62 may then flow to cooler 70, which may be a series of smaller tubes with fins exposed to an open air fan 71 to convect away further heat. Cooler 70 may lower the temperature of the coolant sufficiently so that impurities, such as oxides, will solidify or precipitate from the fluid coolant.

Purifier 80 may include chemical reactants, catalysts, and/or mechanical filters like cold traps, mesh, or other filter media that removes impurities or debris, including precipitates that come out of solution, following cooler 70. Bypass valves 81 and 82 may permit flow bypass of purifier 80, allowing flow to be raised or lowered slowly, and otherwise controlled, through purifier 80 during startup or shutdown. Colder, filtered coolant then passes back through regenerative heat exchanger 60 through input 66 to reheat the coolant to near operating temperatures before being returned to an intermediate loop via output 67, typically just downstream from inlet 50 in the intermediate loop. In this way, the coolant passed through system 10 for cleanup minimizes heat loss from the intermediate loop.

SUMMARY

Example embodiments include combined cleanup and heat removal systems and coolant loops joined to the such systems. The coolant loops may have a hot leg connecting between the reactor to a heat extractor like a steam generator or heat exchanger and a cold leg opposite the hot leg returning from the heat extractor to the reactor. Example embodiment cleanup and heat sink systems connect to the hot leg and/or cold leg and, depending on plant situation and/or operator input, function to remove impurities or debris from the fluid coolant flowing in the loop and/or remove a substantial amount of heat from the fluid coolant. The combined system may selectively create flow between the hot leg and the cold leg, which may bypass the heat extractor entirely to permit draining and shutdown operations on the same, even as the reactor is still generating large amounts of heat. Similarly, the combined system may work on a single leg and prevent significant heat loss while cleaning the coolant during normal reactor and heat extractor operation. Intermediate modes are also possible, depending on flow path creation, pumping, and/or cooler operations. Purification may be achieved with a cold trap, for example, cooler connected serially with an outlet, and potentially a regenerative heat exchanger, back into the coolant loop, while heat sinking may be achieved by the cooler, potentially operating in a larger-capacity mode, connected in parallel to a bypass outlet back into the coolant loop.

Because the combined system may selectively provide both cleanup and significant cooling to the coolant loop, the system may be structured to operate between both these modes in desired levels of combination. For example, a cooler in the system may switch between modes, or levels of, heat removal. One mode may remove only a small amount of heat from the coolant sufficient to solidify or otherwise precipitate impurities from the coolant, while another mode may sink significant amounts of heat from the coolant, potentially up to full decay heat or even reactor operational levels of heat. Such modality from impurity-removal to heat-sinking levels may be achieved by increasing forced convection, increasing flow path volume flow rate, changing heat sink media, etc. Similarly, inlet volume flow rate may be increased, pumping pressure may be increased, and/or flow paths connecting the hot leg and cold leg of the coolant loop while avoiding a purifier like a cold trap and any regenerative heat exchanger in the system may be created, such as by valves, between these modes.

Example embodiment coolant loops and cleanup/cooler systems are useable in a variety of plants and coolants, including fluid media like a liquid sodium coolant used in a PRISM reactor. Coolant loops may provide for entire bypass of a primary heat extractor like a steam generator by directly connecting hot and cold legs through the cleanup-cooler systems, allowing for isolation and draining of the heat extractor and related pumps for maintenance. The hot leg and cold legs may include portions filled with fluid columns extending vertically higher than cooler, which itself may be above the reactor, and the hot and cold leg in the loop may be positioned with slightly angled horizontal paths that decline back toward the reactor, to prevent backflow into the heat extractor. Example embodiments may thus be installed and operated with several types of coolant loops already existing with purifiers in nuclear reactors, simply by adding additional cooler capacity and/or additional outlets to opposing portions of the loop.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
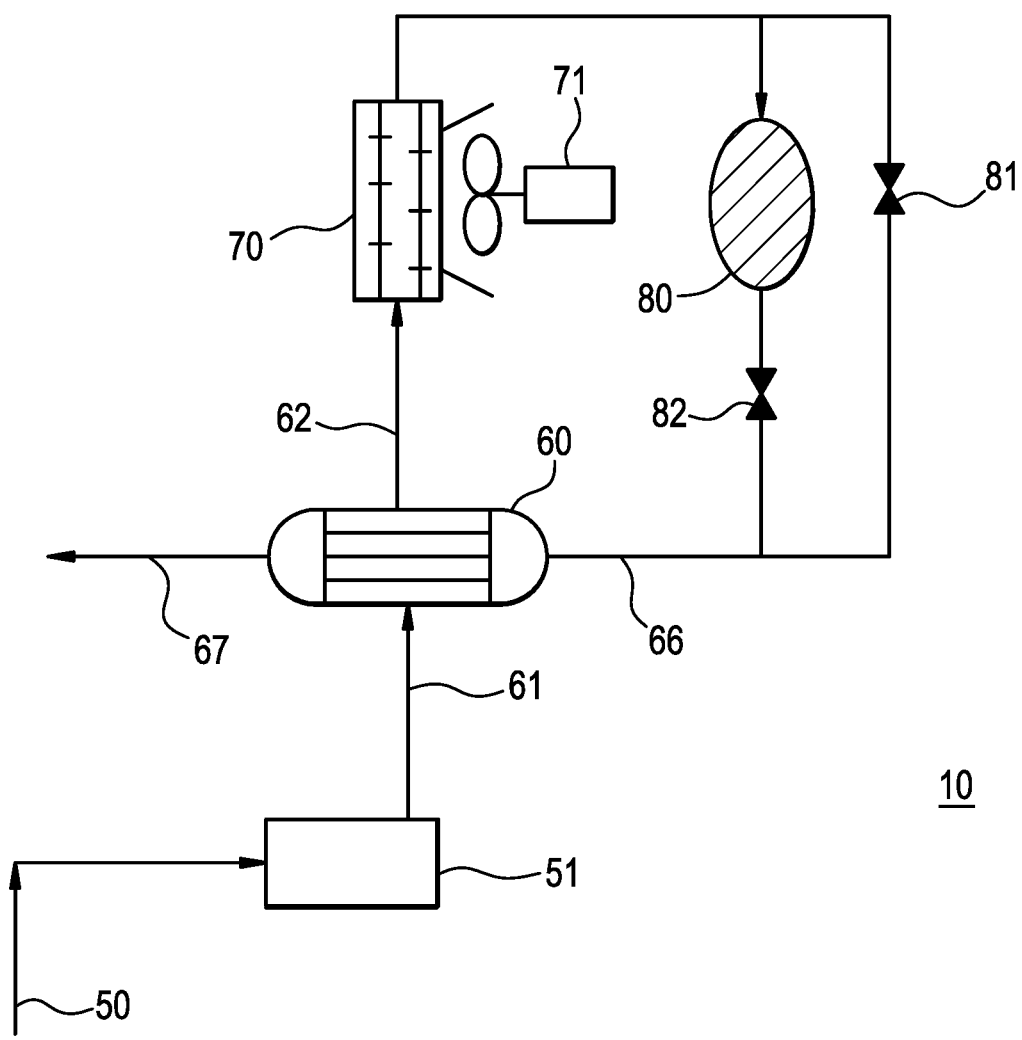
FIG. 1 is an illustration of a related art coolant cleanup system.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the terms "and," "or," and "and/or" include all combinations of one or more of the associated listed items unless it is clearly indicated that only a single item, subgroup of items, or all items are present. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof. As used herein, "axial" and "vertical" directions are the same up or down directions oriented with gravity. "Transverse" and "horizontal" directions are perpendicular to the "axial" and are side-to-side directions in a plane at a particular axial height.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

The Inventors have newly recognized that cleanup systems may be used as a heat sink in a nuclear reactor, instead of merely removing impurities from coolant. The Inventors have further newly recognized that cleanup systems may be used as alternative or parallel coolant loops while intermediate coolant loops are drained and worked on, such as during plant maintenance. While these uses of cleanup systems are contrary to their established functions, the Inventors have recognized that they may solve long-standing problems of emergency cooling and operations maintenance that have traditionally been solved by using other systems and/or fully shutting down a plant. Example embodiments described below uniquely enable these solutions to these and other problems discovered by the Inventors.

The present invention is heat-sink purifier systems, nuclear reactors using the same, and methods of using the same. In contrast to the present invention, the few example embodiments and example methods discussed below illustrate just a subset of the variety of different configurations that can be used as and/or in connection with the present invention.

Figure 2:
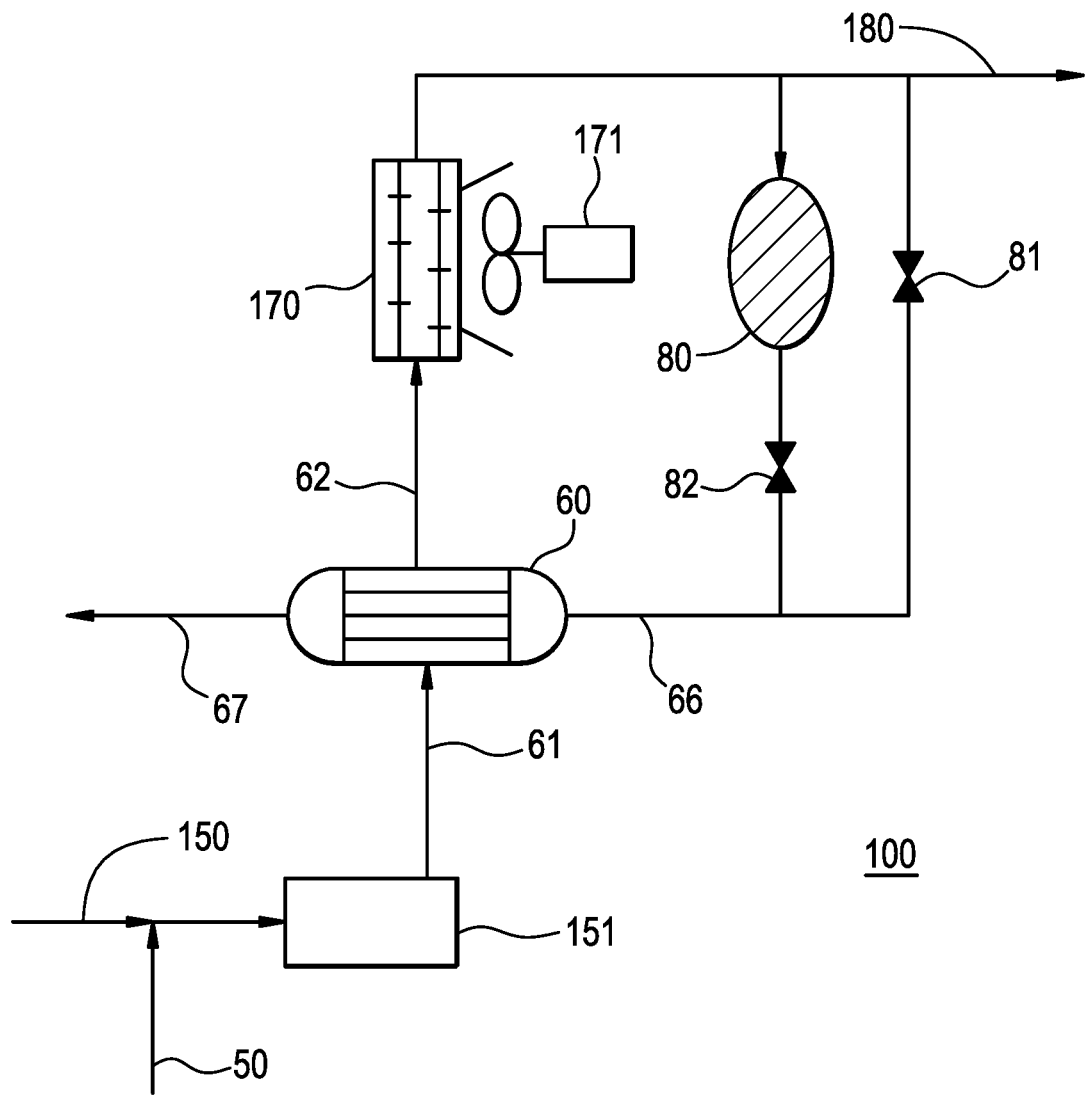
FIG. 2 is an illustration of an example embodiment coolant cleanup and heat sinking system.

FIG. 2 is an illustration of an example embodiment decay heat removal system 100 useable in a commercial nuclear power plant. As seen in FIG. 2, several features of example embodiment system 100 may be similar to the related art system 10 of FIG. 1. In this way example embodiment system 100 is also useable in connection with an intermediate loop carrying a molten heat transfer medium, in a number of different nuclear plant designs. Example embodiment system 100 includes an additional, higher capacity inlet 150 from the intermediate loop, as well as an additional, higher capacity outlet 180 into the intermediate loop. Inlet 150 may, for example, be a valved connection to a hotter side or hot leg 4 (FIG. 3) of an intermediate loop where coolant exits a reactor. Similarly, outlet 180 may be, for example, a valved connection to a colder side or cold leg 8 (FIG. 3) of the intermediate loop where coolant enters the reactor. Inlet 150 and outlet 180 may be separated by great distances, potentially even at opposite sides of an intermediate loop.

Example embodiment decay heat removal system 100 has increased flow and heat transfer capacity to dissipate or sink a substantial portion of heat in the intermediate loop. As such, system 100 may act as a decay heat removal system by removing such heat form the intermediate loop and ultimately the reactor, instead of avoiding heat loss. To accommodate this large-scale heat sinking, additional or larger-scale cooler 170 and fan 171, as well as additional parallel and/or higher-volume pump 151, may be used to remove a substantial amount of heat from a larger amount of coolant directed through example embodiment system 100. For example, system 100 may remove heat equivalent to about 7% of full rated thermal power of a plant. Of course, the amount of heat varies based on plant, one example may sink 5 megawatt-thermal heat from an 840 megawatt-thermal rated plant. Smaller values may also be achieved through selective activation of cooler and flow paths, such as for partial removal of decay heat in combination with other heat removal systems.

Selective activation may be achieved by, for example, cooler 170 including several parallel channels with fins to selectively accommodate larger flows, and/or fan 171 including several speeds or multiple fans or higher-pressure blowers that can be selectively activated to convect large amounts of heat. Or, for example, larger-scale cooler 170 may include other coolant media, submerged sections, counter-flow heat exchangers, printed-circuit heat exchangers, plate-and-frame heat exchangers, and other heat sinks in parallel that can be turned on to selectively dissipate large amounts of heat from the coolant. In this way, cooler 170 may seamlessly change from a purifying mode that removes little heat, such as 0.5 MW or less, from a coolant to a heat-sinking mode that removes much heat, such as around 5 MW or more, from the coolant.

Example embodiment decay heat removal system 100 may be scaled between increased decay heat removal and lower-level cooling useable for purification, such as cold trapping. For example, connections 150 and 180 may be shut off, such as by valves, during normal plant operations without excess heat loss, and system 100 may act as a purification system with purifier 80, returning flow to outlet 67 and receiving flow from inlet 50 nearby in an intermediate loop. When additional cooling is necessary, such as during a transient involving reactor shutdown or loss of other cooling systems, connections 150 and 180 may be opened to enable larger coolant flows, and pump 151, cooler 170, and/or fan 171 may be increased in speed, number, and/or type, to increase heat dissipation from larger coolant flows. Similarly, valves 81 and/or 82 may be closed to avoid purifier 80 and/or reheater 60 when example embodiment system 100 is selectively scaled to decay heat sink levels. Closing off purifier 80 may create direct and/or exclusive coolant flow between connections 150 and 180, improving heat sinking through example system 100 in the additional cooling state. In this way, example embodiment system is compatible with nearly any coolant loop using a cold trap or other purifier, while still providing optional functionality of a selectively-activatable increased heat sink.

Figure 3:
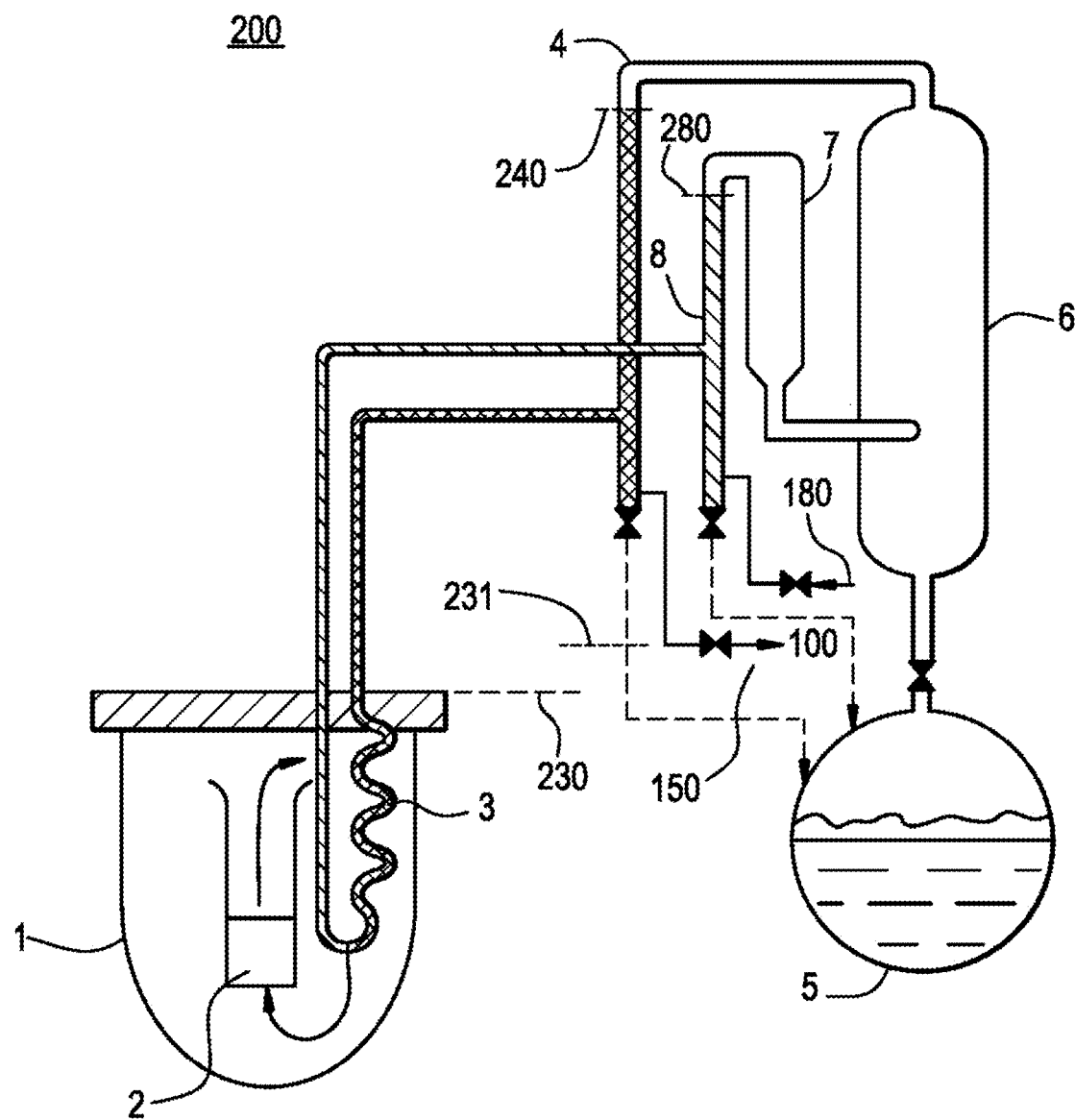
FIG. 3 is an illustration of an example embodiment intermediate loop useable with a nuclear reactor.

FIG. 3 is an illustration of an example embodiment intermediate coolant loop 200 useable in nuclear reactors, including higher-temperature reactors such as a PRISM reactor or molten salt reactor. As shown in FIG. 3, example embodiment intermediate coolant loop 200 may interface with several related or conventional reactor components including reactor 1 housing core 2 with nuclear fuel. An intermediate heat exchanger 3 transfers heat from reactor 1 to intermediate coolant loop 200, which in turn may transfer heat to an extractor like a steam generator 6 or heat exchanger for electricity generation.

As shown in FIG. 3, intermediate coolant loop 200 is interfaced with example embodiment decay heat removal system 100 (FIG. 2) via inlet 150 and outlet 180. For example, inlet 150 may take coolant from a bottom of hot leg 4, where coolant first exits reactor 1 and has its highest energy, and outlet 180 may return coolant to a bottom of cold leg 8, where coolant is returned to reactor 1 and has its lowest energy. For typical cold-trapping purification, inlets 50 and outlets 67 (FIG. 2) might take from a same or nearby position on a same leg to prevent heat loss, unlike inlet 150 and outlet 180 that may be segregated at temperature extremes in example embodiment intermediate coolant loop 200. During a transient state or when larger heat-sinking is desired, inlets 50 and/or outlets 67 may be closed, and inlet 150 and outlet 180 may be opened or enabled to remove heat from coolant that ultimately flows back through intermediate heat exchanger 3, cooling reactor 1.

Example embodiment intermediate coolant loop 200 can also be operable with intermediate pump 7 and steam generator 6, or other heat extractor, drawing heat from the coolant to generate electricity. Intermediate pump 7 and/or steam generator 6 may optionally be deactivated and drained while coolant loop 200 still circulates coolant and sinks heat through inlet 150 and outlet 160. For example, intermediate pump 7, steam generator 6, and/or portions of hot leg 4 and cold leg 8 may be drained into drain tank 5, such as through opening drain valves to drive coolant by gravity into drain tank 5 and/or through active pumping.

Proper sloping of piping in hot leg 4 and cold leg 8 may permit draining of pump 7 and steam generator 6 and their associated piping. For example, horizontal piping of hot leg 4 and cold leg 8 may be at slight angles with respect to the vertical, such as slightly declined toward steam generator 6 and away from reactor 1 at 5-10 millimeters vertical drop per meter length. This decline may further prevent backflowing and ensure coolant looping only through a portion of example embodiment intermediate coolant loop 200 in combination with example positioning discussed below.

Hot leg 4 and cold leg 8 may be arranged such that a column of fluid in hot leg 4 may be at a vertical height 240 and fluid in cold leg 8 may be at a vertical height 280. Columns of fluid in these legs may remain even though other portions of loop 200 are drained. Because of the presence of the columns of fluid at vertical heights 250 and 280 above inlet 150 on hot leg 4 and outlet 180 on cold leg 8, coolant may still be circulated between intermediate heat exchanger 3 and a decay heat removal system 100 (FIG. 2) via the lower portions of hot leg 4 and cold leg 8. In this way, it is possible to repair or otherwise work on an emptied steam generator 6, intermediate pump 7, and/or any other drained portions of coolant loop 200 while still removing heat from reactor 1 via intermediate heat exchanger 3. Of course, example embodiment coolant 200 with system 100 may also be used with a completely-filled loop.

Similarly, in FIG. 3, system 100, or at least cooler 170 (FIG. 2) of system 100, may be placed at a vertical height 231 above intermediate heat exchanger 3 at vertical height 230. The difference in vertical heights 230 and 231 may create natural circulation driving forces, where coolant heated at heat exchanger 3 rises due to lowered density, flows to cooler 170 and is cooled, increasing its density, which then flows by density difference back to heat exchanger 3. This configuration and associated natural circulation may eliminate or reduce the need for active pumping, such as with pump 151 or 7. If all other coolant-filled portions of system 100 are below elevations 240 and 280 of coolant columns, natural circulation will occur in loop 200 through heat exchanger 3 due to gravity and because voids cannot form in system 100 below.

As seen in FIGS. 2 and 3, example embodiment intermediate coolant loop 200 and example embodiment decay heat removal system 100 can be used with several types of nuclear reactors and existing components. Some functionality of loop 200 and system 100 may be achieved simply by increasing capacity of inlet 50 to that of inlet 150, increasing heat sink capacity of a cooler, and adding an exclusive return outlet 180 to cold leg 8. Loop 200 and system 100 may be used during typical reactor operation to remove impurities and/or debris from a relatively small stream of coolant, as well as being selectively scaled to remove all or a significant portion of decay heat or even operation heat from reactor 1 during a transient or non-electricity generating state, such as during an accident or plant maintenance. Similarly, multiple loops 200 and systems 100 are useable with a single reactor 1 to provide even larger amounts of heat transfer and sinking from reactor 1.

Example embodiments and methods thus being described, it will be appreciated by one skilled in the art that example embodiments may be varied and substituted through routine experimentation while still falling within the scope of the following claims. For example, any number of different reactor types and thermodynamic cycles can be used with example embodiments, simply by allowing for different temperatures and coolants. Such variations are not to be regarded as departure from the scope of these claims.

What is claimed is:

1. A coolant loop system carrying a fluid coolant for a nuclear reactor, the system comprising:
   a heat exchanger configured to transfer heat from the reactor to the fluid coolant;
   a heat extractor;
   a hot leg exiting from the heat exchanger and entering the heat extractor;
   a cold leg exiting the heat extractor and entering the heat exchanger;
   a purifier and heat sink system joined to the hot leg and the cold leg so as to permit the fluid coolant to flow directly from the hot leg into, and flow into the cold leg from, the purifier and heat sink system, wherein the purifier and heat sink system is joined to the hot leg and the cold leg on opposite sides of the heat extractor so that the purifier and heat sink system does not flow into the heat extractor.

2. The system of claim 1, wherein the purifier and heat sink system includes,
   an inlet joining to the hot leg,
   a first outlet joining to the hot leg,
   a second outlet joining to the cold leg,
   a cooler configured to remove heat from the fluid coolant flowing from the inlet, and
   a purifier configured to remove impurities solidified by the cooler from the fluid coolant, wherein the purifier is in a series flow with the first outlet and in a parallel flow with the second outlet.

3. The system of claim 2, wherein the inlet includes two connections joining to the hot leg, wherein the connections have different flow volumes from one another.

4. The system of claim 2, wherein the purifier and heat sink system further includes,
   a heat exchanger in series flow with the purifier connected between the inlet and the first outlet so as to decrease the temperature of the fluid coolant flowing from the inlet into the heat exchanger and increase the temperature of the fluid coolant flowing from the heat exchanger into the first outlet.

5. The system of claim 4, wherein the purifier and heat sink system further includes,
   at least one valve configured to allow flow of the fluid coolant to only one of,
   the second outlet, or
   the purifier, the heat exchanger, and the first outlet.

6. The system of claim 1, wherein the purifier and heat sink system includes,
   an inlet joining with the hot leg;
   an outlet joining with the cold leg;
   a bi-modal cooler configured to remove heat from the fluid coolant flowing through the system in a first mode and a second mode, wherein the bi-modal cooler is configured to sink approximately 0.5 MW from the fluid coolant in the first mode and sink approximately 5 MW or more from the fluid coolant in the second mode; and
   a purifier configured to remove impurities solidified by the cooler operating in the first mode from the fluid coolant.

7. The system of claim 6, wherein the bi-modal cooler is vertically above the heat exchanger.

8. The system of claim 7, wherein the hot leg and the cold leg include portions extending both horizontally towards the heat extractor and vertically downward.

9. The system of claim 6, wherein the inlet includes a first connection joining to the hot leg and a second connection joining to the hot leg, and wherein the second connection has a larger flow volume than the first connection and is configured to be closed when the bi-modal cooler is operating in the first mode.

10. The system of claim 6, wherein the bi-modal cooler includes a plurality of finned heat exchange tubes and at least one fan blowing a convection fluid onto the plurality of finned heat exchange tubes.

11. The system of claim 6, wherein the inlet and the hot leg are on an opposite side of the of the heat extractor from the outlet and the cold leg.

12. The system of claim 1, further comprising:
    a drain tank connected to the heat extractor.

13. The system of claim 1, wherein the purifier and heat sink system includes,
    an inlet joining to the hot leg, wherein the inlet is configured to increase flow rate into the purifier and heat sink system in a heat-sinking mode from a lower, non-zero flow rate into the purifier and heat sink system in a cleanup mode,
    a first outlet joining directly to the hot leg, and
    a second outlet joining directly to the cold leg, wherein the second outlet is configured to close in the cleanup mode.

* * * * *